US010865115B2

(12) United States Patent
Poddar et al.

(10) Patent No.: US 10,865,115 B2
(45) Date of Patent: Dec. 15, 2020

(54) HIGHLY DISPERSIBLE PRECIPITATED SILICA AND METHOD OF PREPARATION THEREOF

(71) Applicant: Brisil Technologies Private Limited, Rajasthan (IN)

(72) Inventors: Abhisek Poddar, Noida-Uttar Pradesh (IN); Nikhaar Jain, Noida-Uttar Pradesh (IN); Tanmay Pandya, Noida-Uttar Pradesh (IN)

(73) Assignee: BRISIL TECHNOLOGIES PRIVATE LIMITED, Rajasthan (IN)

( * ) Notice: Subject to any disclaimer, the term of this patent is extended or adjusted under 35 U.S.C. 154(b) by 633 days.

(21) Appl. No.: 15/315,825

(22) PCT Filed: May 30, 2015

(86) PCT No.: PCT/IB2015/054115
§ 371 (c)(1),
(2) Date: Dec. 2, 2016

(87) PCT Pub. No.: WO2015/186045
PCT Pub. Date: Dec. 10, 2015

(65) Prior Publication Data
US 2017/0240430 A1    Aug. 24, 2017

(30) Foreign Application Priority Data
Jun. 3, 2014    (IN) .......................... 1473/DEL/2014

(51) Int. Cl.
*C01B 33/193*    (2006.01)
*C08K 3/36*    (2006.01)
*C09C 1/30*    (2006.01)

(52) U.S. Cl.
CPC .............. *C01B 33/193* (2013.01); *C08K 3/36* (2013.01); *C09C 1/3027* (2013.01);
(Continued)

(58) Field of Classification Search
CPC ....... C01B 33/00; C01B 33/193; C01B 33/32; C01P 2006/12; C01P 2006/14;
(Continued)

(56) References Cited

U.S. PATENT DOCUMENTS 5,403,570 A * 4/1995 Chevallier ............ C01B 33/193
423/339
5,851,502 A * 12/1998 Turk ...................... C01B 33/193
423/335
6,524,543 B1 * 2/2003 Rieber ................... C01B 33/32
106/600

OTHER PUBLICATIONS

International Search Report issued in International Application No. PCT/IB2015/054115 dated Sep. 11, 2015.

* cited by examiner

*Primary Examiner* — Smita S Patel
(74) *Attorney, Agent, or Firm* — Hoffmann & Baron, LLP

(57) ABSTRACT

The present invention provides highly dispersible precipitated silica having improved structure and properties for use as reinforcing filler in elastomeric compositions and method of preparation thereof. The present invention further provides an alkaline silicate solution having reduced dielectric constant by digesting biogenic silica source with alkaline solution such that soluble organic compounds present in the biogenic silica source leach into the alkaline silicate solution. The alkaline silicate solution obtained as above is then acidified with a mineral acid under particular conditions of pH, temperature, time etc. to obtain the highly dispersible precipitated silica of the present invention.

7 Claims, 1 Drawing Sheet

(52) U.S. Cl.
CPC ...... *C01P 2004/50* (2013.01); *C01P 2006/12* (2013.01); *C01P 2006/14* (2013.01); *C01P 2006/16* (2013.01); *C01P 2006/17* (2013.01); *C08K 2201/006* (2013.01); *C08K 2201/011* (2013.01)

(58) Field of Classification Search
CPC .............. C01P 2006/16; C01P 2006/17; C01P 2006/11; C01P 2006/19; C01P 2006/20; C01P 2006/21; C01P 2006/22; C01P 2004/32; C01P 2004/39; C01P 2004/50; C01P 2004/54; C01P 2004/61; C08K 3/36; C08K 2201/006; C08K 2201/011; C09C 1/3027; C09C 1/30
See application file for complete search history.

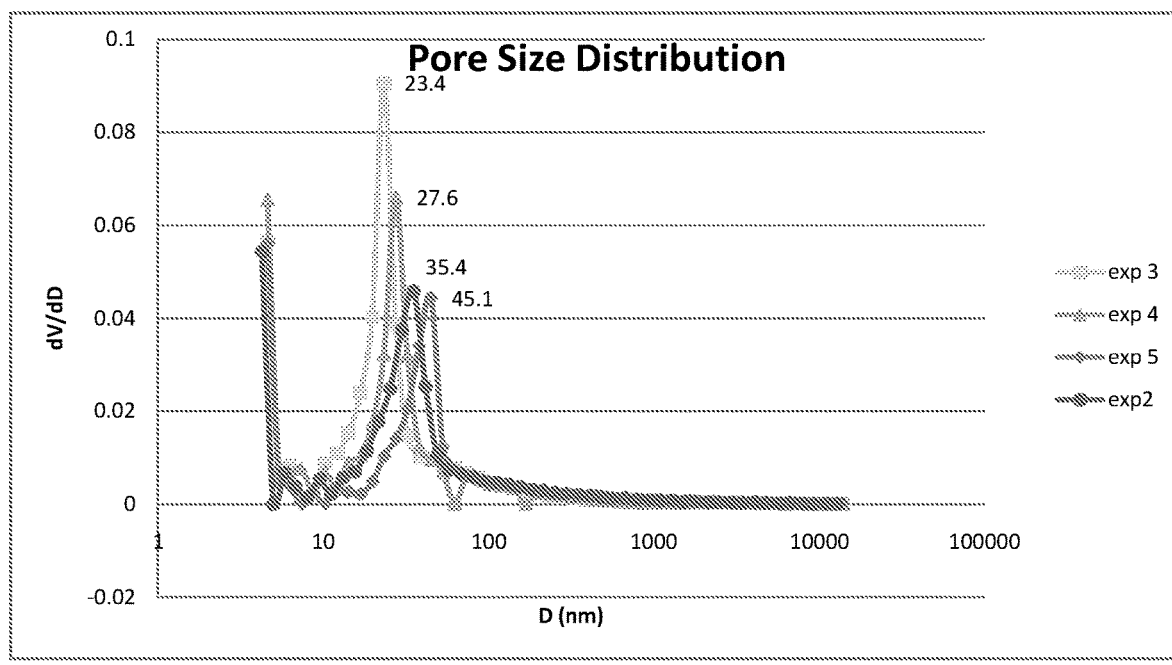

HIGHLY DISPERSIBLE PRECIPITATED SILICA AND METHOD OF PREPARATION THEREOF

CROSS-REFERENCE TO RELATED APPLICATIONS

This application is a National Stage application of International Application No. PCT/IB2015/054115, filed May 30, 2015, which claims benefit to Indian Application No. 1473/DEL/2014, filed Jun. 3, 2014, which are incorporated by reference herein in their entirety.

BACKGROUND

Field

The present invention relates to providing highly dispersible precipitated silica having improved structure and properties for use as reinforcing filler in elastomeric compositions. The present invention further relates to a method for preparation of highly dispersible precipitated silica using biogenic silica sources.

Description of the Related Art

Precipitated silica is widely used as reinforcing fillers in silicone matrices and/or in compositions based on natural or synthetic polymer(s), in particular elastomer(s), especially diene elastomer(s) for example for tires, footwear soles, floor coverings, gas barriers, fire retardant materials, and also technical parts such as rollers for cableways, seals for domestic electrical appliances, seals for liquid or gas pipes, braking system seals, sheathings, cables and transmission belts.

Precipitated silica has a three level structure, composed of primary particles, aggregates and agglomerates. During processing of silica, many primary particles remain condensed into aggregates of typical dimensions of 100-200 nm, which are the real reinforcing species in elastomers. The degree of condensation in aggregates, commonly designated by structure, determines the inter-particle void volume and pore diameter within the aggregates. High structure of precipitated silica implies higher bulkiness (porosity) of the aggregates. The distribution of mesopore sizes in the precipitated silica aggregate structure is of particular importance. High structure precipitated silica have spread of large number of large mesopores in the aggregate structure. The spread of large mesopore sizes generally decrease with increasing surface area unless suitable precipitation techniques are used during production of precipitated silica.

It is known to person skilled in the art that in order to produce optimal reinforcing properties the filler should provide high strength values and high abrasion resistance. Also, to obtain optimal reinforcement the filler should be incorporated and dispersed in the elastomer easily and efficiently. High surface area of precipitated silica provides high strength value and high abrasion resistance whereas high structure of precipitated silica provides high dispersion of filler in the elastomer. Thus it is required that precipitated silica used as reinforcing filler in elastomers should have both high surface area and high structure.

Prior art has attempted to study the effect of varying reaction conditions during precipitation on the structure of precipitated silica in order to obtain high dispersion and reinforcement in elastomers. For example, U.S. Pat. Nos. 5,403,570, 5,705,137, 6,335,396, 7,608,234 and 8,114,935, disclose highly dispersible precipitated silica as potential reinforcing fillers for elastomers obtained by varying reaction conditions like pH, temperature and rate of addition of reactants. However the references fail to improve the structure of precipitated silica as related to reinforcement.

Further, U.S. Pat. No. 7,700,062 discloses a process to produce precipitated silica of desired structure in a reaction medium of reduced ionic strength by adding silicic acid. This patent also discusses about the addition of surface modifying agent to improve the surface of precipitated silica. The reference however fails to improve the structure of precipitated silica as related to reinforcement.

It has been recognized that certain agricultural byproducts or waste materials have varying quantities of biogenic silica, that is, silica which is developed, assimilated or occurs in the cell structures of living organisms such as plants. These byproducts, commonly referred to as "biomass", are principally rice hulls, rice straw, wheat straw, and sugarcane baggase. Other plants that contain biogenic silica, include equisetum ("horsetail weeds"), certain palm leaves ("palmyra palm"), and certain bamboo stems. The biogenic silica in these agricultural byproducts and plants lacks distinct crystalline structure, which means it is amorphous with some degree of porosity.

Rice husk or paddy husk, an agricultural residue is available abundantly in rice producing countries. Rice husk is generally not advocated as cattle feed because of low cellulose and other sugar contents in it. Rice Husks are generally used as an energy source and are pyrolyzed to obtain thermal as well as electrical energy. Rick husk has a high ash content varying from 18-20%. Silica is the major constituent of rice husk ash. Also, commercially available caustic silicate solutions used for production of precipitated silica are conventionally made by fusing high purity soda ash and silica sand in furnaces at temperatures of 1300° to 1500° C. and higher to produce a solid glass. The silicate solution is made by dissolving the glass with steam and hot water. Both processes are very energy intensive, thus very expensive. Thus it is required to develop a process to extract precipitated silica from these biogenic sources like rice husk ash which is economical, less energy intensive and that produce highly dispersible precipitated silica which has improved reinforcing properties when used as filler in elastomers.

WIPO patent publication numbers WO 2001/074712 and WO 2004/073600 also provide process of producing precipitated silica from rice husk ash through precipitation techniques. But both the references fail to provide precipitated silica of improved structure as related to reinforcement of elastomers.

The present invention satisfies the existing needs, as well as others, and generally overcomes the deficiencies found in the prior art.

SUMMARY

The main object of the present invention is to provide highly dispersible precipitated silica having improved structure and improved reinforcing properties for use as reinforcing filler in elastomeric compositions.

It is an object of the present invention to provide a novel process for preparing highly dispersible precipitated silica using biogenic silica sources.

A further object of the present invention to provide a novel process for preparing highly dispersible precipitated silica in a reaction medium having reduced dielectric constant wherein the rate of aggregation of primary particles is controlled to produce silica of improved structure for better reinforcement in elastomers.

It is another object of the present invention to provide highly dispersible precipitated silica having high structure, improved chemical and physical properties, high surface area and therefore having improved reinforcing properties.

It is a further object of the present invention to provide an alkaline silicate solution having low dielectric constant containing dissolved organic liquids from biogenic silica sources.

Another object of the present invention is to provide highly dispersible precipitated silica which obviates the limitations associated with known art.

Yet another object of the present invention is to provide a process that is technically and commercially feasible.

Other objects of the present invention will be apparent from the description of the invention herein below.

The present invention provides highly dispersible precipitated silica having improved structure and improved properties for use as reinforcing filler in elastomeric compositions, using biogenic silica sources.

In an embodiment of the present invention, a process for preparation of highly dispersible precipitated silica comprises the steps of:
  a) preparing an alkaline silicate solution having reduced dielectric constant in a first reactor vessel by digesting biogenic silica source with an alkaline solution such that soluble organic compounds in the silica source leach into the silicate solution;
  b) adding water into a second reactor vessel and maintaining a suitable temperature;
  c) adding the alkaline silicate solution as obtained in step (a) and an acidifying agent simultaneously to the second reactor vessel while maintaining suitable pH and temperature for a suitable time so as to reach a final silica concentration range of 20-60 g/L
  d) stopping the addition of the alkaline silicate solution and continuing adding the acidifying agent so as to reach a pH of 3-5 to obtain an aqueous silica dispersion;
  e) filtering the aqueous silica dispersion to obtain a filtered cake; and
  f) washing and drying the filtered cake to obtain the highly dispersible precipitated silica.

In one embodiment, the present invention provides a highly dispersible precipitated silica having the following properties:
(i) BET surface area ranging from 100 to 225 $m^2/g$;
(ii) Total Pore Volume measured by Mercury Intrusion Porosimetry ranging from 1.5-6 ml/g;
(iii) Peak of pore size distribution measured by Mercury Intrusion Porosimetry ranging from 25 to 60 nm; and
(iv) Surface Area measured by Mercury Intrusion Porosimetry ranging from 150-300 $m^2/g$.

BRIEF DESCRIPTION OF THE DRAWINGS

FIG. 1 illustrates pore size distribution graphs of the precipitated silica obtained in Examples 2 to 5 abbreviated as exp 2, exp 3, exp 4 and exp 5.

DETAILED DESCRIPTION

The embodiments herein and the various features and advantageous details thereof are explained more fully with reference to the non-limiting embodiments that are detailed in the following description. Descriptions of well-known components and processing techniques are omitted so as to not unnecessarily obscure the embodiments herein.

The present invention provides highly dispersible precipitated silica having improved structure and improved properties for use as reinforcing filler in elastomeric compositions.

The terms "silica" and "precipitated silica" are used synonymously in the present invention.

The term "structure" of precipitated silica refers to pores formed within the precipitated silica. High structure precipitated silica means high porous volume of silica.

As used herein, the term "biomass" or "biogenic source(s)" as used herein, unless otherwise specified, refers to rice husk, rice straw, wheat straw, sugarcane baggase or other lignocellulose biogenic silica sources. Some other natural sources that contain biogenic silica include equisetum such as "horsetail weeds", certain palm leaves like "palmyra palm" and certain bamboo stems.

As used herein, the term "thermal pyrolysis" includes gasification, combustion, incineration, and any and all forms of heat which produces rice husk ash/char and amorphous carbon from rice husks. Any process in which thermal pyrolysis is used to produce rice hull ash and amorphous carbon from rice hulls may be used in the present invention.

As used herein, the term "modulus" of silicate solution refers to molar ratio of $SiO_2$ to $Na_2O$ and is obtained by the following expression:

$$\text{Modulus } R = (\%\ SiO2/\%\ Na2O) \times (1.032)$$

As used herein, the term "combination" refers to materials added together with or without substantial mixing towards achieving homogeneity.

As used herein, the term "mix" refers to adding materials together and achieving homogeneity, and the term "mixture" refers to mixed materials achieving homogeneity.

As used herein, the terms "comprise" "comprises" "comprising" "include", "includes", and "including" are meant to be non-limiting, i.e., other steps and other ingredients which do not affect the end of result can be added. The above terms encompass the terms "consisting of and "consisting essentially of".

In an embodiment of the present invention, a process for the preparation of highly dispersible precipitated silica comprises the steps of:
  a) preparing an alkaline silicate solution having reduced dielectric constant in a first reactor vessel by digesting biogenic silica source with an alkaline solution such that soluble organic compounds in the silica source leach into in the silicate solution;
  b) adding water into a second reactor vessel and maintaining a suitable temperature;
  c) adding the alkaline silicate solution as obtained in step (a) and an acidifying agent simultaneously to the second reactor vessel while maintaining suitable pH and temperature for a suitable time so as to reach a final silica concentration range of 20-40 g/L
  d) stopping the addition of the alkaline silicate solution and continuing adding the acidifying agent so as to reach a pH of 3-5 to obtain an aqueous silica dispersion;
  e) filtering the aqueous silica dispersion to obtain a filtered cake; and
  f) washing and drying the filtered cake to obtain the highly dispersible precipitated silica.

In accordance with the present invention, the highly dispersible precipitated silica of desired properties is produced by controlling the following parameters during the reaction: temperature, pH, silica concentration and electrostatic properties of the reaction medium such as dielectric constant.

One embodiment of the present invention is to precipitate silica under reduced dielectric constant. The reduction of dielectric constant of reaction medium influences the formation of silica primary particles, aggregates and agglomerates. Thus the result is the formation of silica precipitates with improved structure having better reinforcing ability in elastomeric matrices. In accordance with the present invention, the dielectric constant of a reaction medium is reduced by leaching soluble organic compounds, mainly polycyclic aromatic hydrocarbons, present in biogenic silica source in situ while digesting biogenic silica source with an alkaline solution. These organic compounds such as polycyclic aromatic hydrocarbons are formed by partial combustion of cellulose, lignin and other carbonaceous compounds in the biogenic silica source, preferably by gasification of the biogenic silica under partial oxygen atmosphere.

In an embodiment of the present invention, the alkaline solution as used in step (a) can be selected from the group comprising sodium hydroxide solution, potassium hydroxide solution and the like or mixtures thereof.

In one embodiment of the present invention, biogenic silica can be derived from thermal pyrolysis of biogenic silica source. In one exemplary embodiment of the present invention, the biogenic silica source can be selected from the group comprising rice husk char, paddy straw char or char of any lignocellulose biogenic silica source containing greater than 35% silica and greater than 5% carbonaceous compounds.

In one embodiment of the present invention, the biogenic silica source is digested with the alkaline solution for a time period ranging from 1 hour to 8 hours, more preferably 3 hours to 8 hours.

In another embodiment of the present invention, ratio of the alkaline solution and the biogenic silica as used in step (a) ranges from 1:4 to 4:1. Ratio=weight of biogenic silica source/Volume of alkaline solution.

The modulus of the alkaline silicate solution of the present invention can vary from 2 to 3.3.

In one embodiment of the present invention, the suitable temperature in step (c) ranges from 70-90° C. The reactor vessel is equipped with a heating system with a temperature control such that the temperature of a reaction medium can be raised and maintained upto 150° C.

In another embodiment of the present invention, the suitable pH in step (c) ranges from 7 to 10 and the suitable time is 40 to 90 minutes.

In one embodiment of the present invention, the acidifying agent as used in step (c) can be selected from mineral acids and/or inorganic acids. Preferably, the acidifying acid is a mineral acid selected from the group comprising sulfuric acid, hydrochloric acid, nitric acid and phosphoric acid. In a preferred embodiment, the acidifying agent can be sulfuric acid.

In another embodiment of the present invention, the temperature maintained for all the steps ranges from 70° C. to 120° C., preferably 70° C. to 100° C., more preferably 70° C. to 90° C.

In an embodiment of the present invention, the filtration as in step (e) can be achieved by any conventional filtration method using filter medium such as a membrane medium (bag filter), a sintered metal fiber filter, membrane filter, vacuum filter and the like.

In another embodiment, the drying as in step (f) can be achieved by any conventional drying methods and equipment, such as convection or radiant heaters, rotary drum dryers, spray dryers, more preferably spray drying.

In an embodiment of the present invention, the pH of the precipitated silica of the present invention is measured by any convenient commercially available pH meter.

In another embodiment of the present invention, the precipitated silica can be provided in the form of beads, granules (or other aggregates) or, preferably, of powder having a mean particle size or a median particle diameter ranging from 1 micron to 500 micron. This silica is particularly suitable for being used as reinforcing filler in elastomeric compositions.

In one embodiment, the present invention provides a highly dispersible precipitated silica having the following properties:
(i) BET surface area ranging from 100 to 225 $m^2/g$;
(ii) Total Pore Volume measured by Mercury Intrusion Porosimetry ranging from 1.5-6 ml/g;
(iii) Peak of pore size distribution measured by Mercury Intrusion Porosimetry ranging from 25 to 60 nm; and
(iv) Surface Area measured by Mercury Intrusion Porosimetry ranging from 140-250 $m^2/g$ The BET surface area of the precipitated silica of the present invention ranges from 100 to 225 $m^2/gm$, more preferably 120-220 $m^2/gm$. The BET specific surface is determined according to the Brunauer-Emmett-Teller method described in the Journal of the American Chemical Society, vol. 60, page 309, February 1938, corresponding to standard NFT 45007 (November 1987).

In a yet another embodiment, the highly dispersible precipitated silica of the present invention has the Pore size Distribution of mesopores as shown below in Table 1:

TABLE 1

Pore size Distribution of mesopores of the highly dispersible precipitated silica

| Mesopore size Interval (nm) | Pore Volume by Mercury Intrusion (ml/g) MIP surface area 200-240 ($m^2/g$) | Pore Volume by Mercury Intrusion (ml/g) MIP surface area 240-280 ($m^2/g$) | Pore Volume by Mercury Intrusion (ml/g) MIP surface area 140-200 ($m^2/g$) |
|---|---|---|---|
| 10 to 20 | 0.05-0.15 | 0.15-0.25 | 0.05-2 |
| 20 to 30 | 0.15-0.4 | 0.4-0.5 | 0.1-0.3 |
| 30 to 40 | 0.2-0.5 | 0.1-0.2 | 0.25-0.35 |
| 40 to 50 | 0.1-0.25 | 0.1-0.2 | 0.1-0.3 |

The present invention provides highly dispersible precipitated silica capable of being used as reinforcing filler in tires of automobiles which reduces fuel consumption of automobiles.

While certain embodiments have been shown and described, various modifications and substitutions may be made thereto without departing from the spirit and scope of the disclosure. Therefore, it is to be understood that the present disclosure has been described by way of illustration and not limitations.

The present invention is further illustrated by non-limiting examples. In each the prepared high dispersible precipitated silica was characterized for surface area determination, porosity and other physicochemical properties.

The present invention provides highly dispersible precipitated silica having improved structure and improved properties for use as reinforcing filler in elastomeric compositions.

The present invention provides a novel process for preparing highly dispersible precipitated silica using biogenic silica sources.

The present invention provides a novel process for preparing highly dispersible precipitated silica wherein the rate of aggregation of primary particles is controlled to produce silica of improved structure for better reinforcement in elastomers.

The present invention provides highly dispersible precipitated silica having high structure, improved chemical and physical properties, high surface area and therefore having improved reinforcing properties.

The present invention provides a process for preparing highly dispersible precipitated silica in a reaction medium having reduced dielectric constant.

The present invention provides an alkaline silicate solution having low dielectric constant containing dissolved organic liquids from biogenic silica sources.

The present invention provides highly dispersible precipitated silica which obviates the limitations associated with known art.

The present invention provides a process that is technically and commercially feasible.

The present invention provides highly dispersible precipitated silica capable of being used as reinforcing filler in tires of automobiles which reduces fuel consumption of automobiles.

Other advantages of the present invention will be apparent from the description of the invention herein below.

EXAMPLES

The present invention is further explained in the form of following examples. However, it is to be understood that the foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

Example 1

Preparation of Sodium Silicate Solution Having Low Dielectric Constant

Rice Husk Char containing 43% carbonaceous material and 52% silica and 1N sodium hydroxide was used for preparation of sodium silicate solution with low dielectric constant. The reaction was carried out in a 56 liter jacketed reactor vessel. The reactor was equipped with a variable speed agitator and heater with temperature measurement and control.

5 kg of rice husk char and 20 liters of 1N sodium hydroxide was added to the reactor. The reaction mixture was stirred vigorously at 900 rpm and a temperature of 98° C. was maintained during the reaction. The reaction was carried out for 6 hrs until all the soluble organic compounds in the char leaches into in the sodium silicate solution. The black slurry obtained after the reaction was filtered and washed with water to obtain sodium silicate solution. The sodium silicate solution was clear and yellowish brown in color. The color of the sodium silicate solution was primarily because of the dissolved organic liquids in the sodium silicate solution.

The sodium silicate solution obtained had the properties as shown in Table 2:

TABLE 2

Properties of the sodium silicate solution obtained in Example 1

| | |
|---|---|
| Amount of $Na_2O$ | 1.84% by weight |
| Amount of $SiO_2$ | 4.08% by weight |
| Modulus | 2.29 |
| pH | 11.54 |

Following examples are directed to produce highly dispersible precipitated silica from the sodium silicate solution as produced in Example 1.

Example 2

Preparation of Highly Dispersible Precipitated Silica 10 liters of water was added to the reactor and the temperature was raised to 90° C. Sodium silicate solution having low dielectric constant as obtained in Example 1 and 98% concentrated sulfuric acid were added simultaneously to the reactor so as to maintain the pH of the reaction mixture at 8-8.5. The reaction temperature was maintained at 90° C. The addition of sodium silicate solution was stopped after 60 minutes. Sulfuric acid was added till the pH of the reaction mixture reached 3-4. The agitator is in operation during the whole precipitation time at 500 rpm. The precipitated silica is separated from the reaction slurry by vacuum filtration and spray dried.

The obtained precipitated silica has a BET surface area of 167 $m^2/g$, pore volume by mercury porosimetry of particle diameter less than 1 micrometer was 2.946 $cm^3/g$, surface area by mercury porosimetry was 222 $m^2/g$ and peak of pore size distribution curve was found at 35.4 nm. The pore size distribution of mesopores was as shown in Table 3.

TABLE 3

The pore size distribution of mesopores of the precipitated silica of Example 2

| Mesopore size Interval (nm) | Pore Volume by Mercury Intrusion (ml/g) |
|---|---|
| 10 to 20 | 0.08 |
| 20 to 30 | 0.17 |
| 30 to 40 | 0.45 |
| 40 to 50 | 0.25 |
| 50 to 60 | 0.1 |

Example 3

Preparation of Highly Dispersible Precipitated Silica 10 liters of water was added to the reactor and the temperature was raised to 85° C. Sodium silicate solution having low dielectric constant as obtained in Example 1 and 98% conc. sulfuric acid were added simultaneously to the reactor so as to maintain the pH of the reaction mixture at 8-8.5. The reaction temperature was maintained at 85° C. The addition of sodium silicate solution was stopped after 50 minutes. Sulfuric acid was added till the pH of the reaction mixture reached 3-4. The agitator was in operation during the whole precipitation time at 500 rpm. The precipitated silica is separated from the reaction slurry by vacuum filtration and spray dried.

The obtained precipitated silica has a BET surface area of 182 m$^2$/g, pore volume(by mercury porosimetry) of particle diameter (less than 1 micrometer) was 2.226 cm$^3$/g, surface area by mercury porosimetry was 262 m$^2$/g and peak of pore size distribution curve was found at 23.4 nm. The pore size distribution of mesopores was as shown in Table 4.

TABLE 4

The pore size distribution of mesopores of the precipitated silica of Example 3

| Mesopore size Interval (nm) | Pore Volume by Mercury Intrusion (ml/g) |
|---|---|
| 10 to 20 | 0.2 |
| 20 to 30 | 0.48 |
| 30 to 40 | 0.13 |
| 40 to 50 | 0.13 |
| 50 to 60 | 0.07 |

Example 4

Preparation of Highly Dispersible Precipitated Silica 10 liters of water was added to the reactor and the temperature was raised to 85° C. Sodium silicate solution having low dielectric constant as obtained in Example 1 and 98% conc. sulfuric acid were added simultaneously to the reactor so as to maintain the pH of the reaction mixture at 8-8.5. The reaction temperature was maintained at 85° C. The addition of sodium silicate solution was stopped after 60 minutes. Sulfuric acid was added till the PH of the reaction mixture reached 3-4. The agitator was in operation during the whole precipitation time at 500 rpm. The precipitated silica is separated from the reaction slurry by vacuum filtration and spray dried.

The obtained precipitated silica has a BET surface area of 158 m$^2$/g, pore volume of particle diameter (less than 1 micrometer) was 2.09 cm$^3$/g, surface area by mercury porosimetry was 233 m$^2$/g and peak of pore size distribution curve was found at 27.6 nm. The pore size distribution of mesopores was as shown in Table 5.

TABLE 5

The pore size distribution of mesopores of the precipitated silica of Example 4

| Mesopore size Interval (nm) | Pore Volume by Mercury Intrusion (ml/g) |
|---|---|
| 10 to 20 | 0.104 |
| 20 to 30 | 0.39 |
| 30 to 40 | 0.23 |
| 40 to 50 | 0.12 |
| 50 to 60 | 0.06 |

Example 5

Preparation of Highly Dispersible Precipitated Silica 10 liters of water was added to the reactor and the temperature was raised to 90° C. Sodium silicate solution having low dielectric constant as obtained in Example 1 and 98% conc. sulfuric acid were added simultaneously to the reactor so as to maintain the pH of the reaction mixture at 8-8.5. The reaction temperature was maintained at 85° C. The addition of sodium silicate solution was stopped after 70 minutes. Sulfuric acid was added till the pH of the reaction mixture reached 3-4. The agitator was in operation during the whole precipitation time at 500 rpm. The precipitated silica is separated from the reaction slurry by vacuum filtration and spray dried.

The obtained precipitated silica has a BET surface area of 132 m$^2$/g, pore volume of particle diameter (less than 1 micrometer) was 2.61 cm$^3$/g, surface area by mercury porosimetry was 182 m$^2$/g and peak of pore size distribution curve was found at 45.1 nm. The pore size distribution of mesopores was as shown in Table 6.

TABLE 6

The pore size distribution of mesopores of the precipitated silica of Example 5

| Mesopore size Interval (nm) | Pore Volume by Mercury Intrusion (ml/g) |
|---|---|
| 10 to 20 | 0.03 |
| 20 to 30 | 0.10 |
| 30 to 40 | 0.29 |
| 40 to 50 | 0.41 |
| 50 to 60 | 0.07 |

Physiochemical properties of the precipitated silica obtained from above Examples 2-5 is described below in Table 5:

TABLE 5

Physiochemical properties of the precipitated silica obtained in Examples 2 to 5

| Example No. | 2 | 3 | 4 | 5 |
|---|---|---|---|---|
| Moisture (%) | 6.4 | 6.9 | 7.1 | 6.1 |
| pH | 7.44 | 7.45 | 7.43 | 7.78 |
| BET surface Area (m$^2$/g) | 167 | 182 | 158 | 132 |
| Surface Area by Mercury Instrusion Porosimetry (m$^2$/g) | 222 | 260 | 233 | 182 |
| Pore Volume by mercury porosimetry (cm$^3$/g) of pores less than 1 micrometer | 2.94 | 2.226 | 2.09 | 2.61 |
| Peak of Pore Size Distribution by Hg Porosimetry (nm) | 35.4 | 23.4 | 28.6 | 45.1 |

FIG. 1 illustrates pore size distribution graphs of the precipitated silica obtained in Examples 2 to 5 abbreviated as exp 2, exp 3, exp 4 and exp 5.

Although the present invention has been described with reference to preferred embodiments, persons skilled in the art will recognize that changes may be made in form and detail without departing from the spirit and scope of the invention. The embodiments were chosen and described in order to best explain the principles of the present invention and its practical application, to thereby enable others skilled in the art to best utilize the present invention and various embodiments with various modifications as are suited to the particular use contemplated. Those skilled in the art will recognize, or be able to ascertain, using no more than routine experimentation, many equivalents to specific embodiments of the invention described specifically herein. Such equivalents are intended to be encompassed in the scope of the following claims.

We claim:

1. A process for preparation of highly dispersible precipitated silica comprising the steps of:
   a) preparing an alkaline silicate solution having reduced dielectric constant in a first reactor vessel by digesting biogenic silica source with an alkaline solution at a temperature ranging from 80-120° C. such that soluble organic compounds in the biogenic silica source leach into the alkaline silicate solution;
   b) adding water into a second reactor vessel and maintaining a suitable temperature;
   c) adding the alkaline silicate solution as obtained in step (a) and an acidifying agent simultaneously to the second reactor vessel while maintaining suitable pH in the range of 8-8.5 and a suitable temperature for a suitable time so as to reach a final silica concentration range of 20-80 g/L;
   d) stopping the addition of the alkaline silicate solution and continuing adding the acidifying agent so as to reach a pH of 3-4 to obtain an aqueous silica dispersion;
   e) filtering the aqueous silica dispersion to obtain a filtered cake; and
   f) washing and drying the filtered cake to obtain the highly dispersible precipitated silica;

wherein the biogenic silica source and the alkaline solution are in a ratio of 1:4 to 4:1;

modulus of the alkaline silicate solution is in the range of 2 to 3.3 and the highly dispersible precipitated silica has the following pore size distribution of mesopores measured by Mercury Intrusion Porosimetry (MIP):

| Mesopore size Interval (nm) | Pore Volume by Mercury Intrusion (ml/g) MIP surface area 200-240 ($m^2/g$) | Pore Volume by Mercury Intrusion (ml/g) MIP surface area 240-280 ($m^2/g$) | Pore Volume by Mercury Intrusion (ml/g) MIP surface area 140-200 ($m^2/g$) |
| --- | --- | --- | --- |
| 10 to 20 | 0.05-0.15 | 0.15-0.25 | 0.05-0.2 |
| 20 to 30 | 0.15-0.4 | 0.4-0.5 | 0.1-0.3 |
| 30 to 40 | 0.2-0.5 | 0.1-0.2 | 0.25-0.35 |
| 40 to 50 | 0.1-0.25 | 0.1-0.2 | 0.1-0.3. |

2. The process of claim 1, wherein the alkaline solution as used in step (a) is selected from the group consisting of sodium hydroxide, potassium hydroxide, and a combination thereof.

3. process of claim 1, wherein the biogenic silica source is selected from the group consisting of rice husk char, paddy straw char, wheat straw char, sugarcane, and baggase char.

4. The process of claim 1, wherein the acidifying agent is selected from the group consisting of sulfuric acid, hydrochloric acid, nitric acid, and phosphoric acid.

5. The process of claim 1, wherein the biogenic silica source is digested with the alkaline solution for a time period ranging from 3 hours to 8 hours.

6. The process of claim 1, wherein the suitable temperature in step (c) ranges from 70-90° C.

7. The process of claim 1, wherein the suitable time in step (c) ranges from 40 to 90 minutes.

* * * * *